United States Patent
Lee et al.

(10) Patent No.: US 11,658,413 B2
(45) Date of Patent: May 23, 2023

(54) HIGH FREQUENCY-BASED ARRAY ANTENNA AND COMMUNICATION METHOD THEREFOR

(71) Applicant: Electronics and Telecommunications Research Institute, Daejeon (KR)

(72) Inventors: Jung Nam Lee, Sejong-si (KR); Woo Jin Byun, Daejeon (KR); Kwang Seon Kim, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/712,767

(22) Filed: Apr. 4, 2022

(65) Prior Publication Data
US 2022/0320732 A1 Oct. 6, 2022

(30) Foreign Application Priority Data

Apr. 2, 2021 (KR) ........................ 10-2021-0043082

(51) Int. Cl.
*H01Q 21/20* (2006.01)
*H01Q 3/36* (2006.01)
(Continued)

(52) U.S. Cl.
CPC ............... *H01Q 3/36* (2013.01); *H01Q 5/28* (2015.01); *H01Q 15/0033* (2013.01); *H04B 7/043* (2013.01)

(58) Field of Classification Search
CPC .. H01Q 3/36; H01Q 3/26; H01Q 5/28; H01Q 15/0033; H01Q 15/14; H01Q 19/19;
(Continued)

(56) References Cited

U.S. PATENT DOCUMENTS 5,959,578 A * 9/1999 Kreutel, Jr. .............. H01Q 3/26
342/368
9,516,563 B2 * 12/2016 Maltsev .......... H04W 36/00835
(Continued)

FOREIGN PATENT DOCUMENTS

KR 10-0969578 7/2010
KR 10-2017-0108365 9/2017
(Continued)

OTHER PUBLICATIONS

Q. Wu et al., "A novel flat lens horn antenna designed based on zero refraction principle of metamaterials", Applied Physics A 87, 2007, pp. 151-156.
(Continued)

*Primary Examiner* — Awat M Salih
(74) *Attorney, Agent, or Firm* — Kile Park Reed & Houtteman PLLC

(57) ABSTRACT

An array antenna capable of steering a beam in a first communication node of a wireless communication system may comprise: a plurality of single antennas each capable of variably adjusting a beam steering direction; a plurality of beamforming control units each of which is connected to each of the plurality of single antennas to control a beamforming operation of each of the plurality of single antennas; and an array antenna control unit connected to the plurality of beamforming control units to control a beamforming operation of the entire array antenna, wherein the plurality of single antennas are arranged in a cylindrical shape and are installed to face a direction opposite to a central direction of the cylinder shape, and the array antenna is configured to steer a beam to a predetermined area around the first communication node through at least one single antenna among the plurality of single antennas.

12 Claims, 16 Drawing Sheets

(51) Int. Cl.
*H04B 7/0426* (2017.01)
*H01Q 5/28* (2015.01)
*H01Q 15/00* (2006.01)

(58) Field of Classification Search
CPC ...... H01Q 21/205; H01Q 21/06; H01Q 1/246; H04B 7/043
See application file for complete search history.

(56) References Cited

U.S. PATENT DOCUMENTS

| | | |
|---|---|---|
| 10,573,966 B2 | 2/2020 | Ko et al. |
| 10,868,367 B2 | 12/2020 | Lee et al. |
| 10,910,709 B1* | 2/2021 | Hill ................ H01Q 3/385 |
| 2002/0105928 A1* | 8/2002 | Kapoor .............. H04B 7/086 |
| | | 370/347 |
| 2008/0117961 A1* | 5/2008 | Han ................ H04B 7/0617 |
| | | 375/299 |
| 2009/0322608 A1* | 12/2009 | Adams ............... H01Q 1/246 |
| | | 342/368 |
| 2010/0090898 A1* | 4/2010 | Gallagher ............ H01Q 3/26 |
| | | 342/373 |
| 2015/0288438 A1* | 10/2015 | Maltsev ............. H04W 16/28 |
| | | 455/101 |
| 2015/0333811 A1* | 11/2015 | Yu .................. H04B 7/0456 |
| | | 370/329 |
| 2016/0087349 A1* | 3/2016 | Lee ................ H01Q 21/061 |
| | | 342/373 |
| 2016/0135180 A1* | 5/2016 | Yuan ................ H01Q 3/267 |
| | | 370/329 |
| 2018/0241122 A1* | 8/2018 | Jalali Mazlouman ... H01Q 3/34 |
| 2018/0331431 A1* | 11/2018 | Lee ................ H01Q 19/191 |
| 2019/0252796 A1* | 8/2019 | Mahanfar ............ H01Q 21/24 |
| 2020/0119785 A1* | 4/2020 | Varatharaajan ...... H04B 7/0617 |
| 2020/0161754 A1 | 5/2020 | Cho et al. |
| 2020/0169291 A1 | 5/2020 | Cho et al. |
| 2020/0382208 A1* | 12/2020 | Hormis ............. H04B 7/1555 |

FOREIGN PATENT DOCUMENTS

| | | |
|---|---|---|
| KR | 10-1775456 | 9/2017 |
| KR | 10-2018-0047392 | 5/2018 |
| KR | 10-1859867 | 5/2018 |
| KR | 10-1888399 | 8/2018 |

OTHER PUBLICATIONS

Mustafa K. Taher Al-Nuaimi et al., "Design of High-Directivity Compact-Size Conical Horn Lens Antenna", IEEE Antennas and Wireless Propagation Letters, 2014, pp. 467-470, vol. 13.

* cited by examiner

HIGH FREQUENCY-BASED ARRAY ANTENNA AND COMMUNICATION METHOD THEREFOR

CROSS-REFERENCE TO RELATED APPLICATIONS

This application claims priority to Korean Patent Application No. 10-2021-0043082 filed on Apr. 2, 2021, with the Korean Intellectual Property Office (KIPO), the entire contents of which are hereby incorporated by reference.

BACKGROUND

1. Technical Field

The present disclosure relates to a high frequency-based array antenna and a communication method using the same, and more particularly, to a high frequency-based array antenna, which can steer a beam around a communication node by configuring the array antenna with a plurality of single antennas, and a communication method using the same.

2. Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

The terahertz wave is a frequency resource in the range of 0.1 to 10 terahertz (THz) and may refer to an electromagnetic wave resource having physical characteristics in which the transmission of radio waves and the straightness of light waves appear simultaneously, corresponding to an intermediate region between far infrared rays and millimeter waves in the electromagnetic wave spectrum. The terahertz frequency band can be applied to a high-speed wireless communication system using a wide frequency bandwidth, for example, it is expected that various embodiments of a communication system using the terahertz band will be introduced in the sixth generation (6G) or later wireless communication technology.

Research on the terahertz band has been limited to oscillation and detection devices that generate and detect short-range signals, and it has a disadvantage in that it is not easy to achieve high output and high sensitivity at medium or long distances. On the other hand, in a study to perform communications in the terahertz band through a beamforming antenna supporting high-gain long-distance transmission, there is a problem in that a shadowing problem due to a narrow beamwidth needs to be solved.

SUMMARY

In order to solve the above-identified problems, exemplary embodiments of the present disclosure are directed to providing a high frequency-based array antenna in which a plurality of high-frequency high-gain single antennas are arranged in a plurality of directions, by which a communication node steer beams in all direction from itself, and a communication method using the same.

According to an exemplary embodiment of the present disclosure for achieving the above-described objective, a first array antenna capable of steering a beam in a first communication node of a wireless communication system may comprise: a plurality of single antennas each capable of variably adjusting a beam steering direction; a plurality of beamforming control units each of which is connected to each of the plurality of single antennas to control a beamforming operation of each of the plurality of single antennas; and an array antenna control unit connected to the plurality of beamforming control units to control a beamforming operation of the entire first array antenna, wherein the plurality of single antennas are arranged in a cylindrical shape and are installed to face a direction opposite to a central direction of the cylinder shape, and the first array antenna is configured to steer a beam to a predetermined area around the first communication node through at least one single antenna among the plurality of single antennas.

Each of the plurality of single antennas may include a primary mirror, a secondary mirror, and a beam emitter, and each of the plurality of beamforming control units connected to each of the plurality of single antennas may be configured to steer a beam by controlling a phase of the beam formed and radiated by the beam emitter.

The beam emitter of each of the plurality of single antennas may be an array emitter formed by arranging a plurality of sub-emitters each capable of forming and radiating a beam.

Each of the plurality of beamforming control units may be configured to variably control a beam steering direction of each of the plurality of single antennas by controlling whether or not to form and emit a beam of each of the plurality of sub-emitters included in each of the connected plurality of single antennas.

Each of the plurality of single antennas may be formed as an antenna of a Cassegrain structure capable of performing beamforming.

Each of the plurality of single antennas may be formed as at least one of a horn antenna, a dielectric patch antenna, and a slot antenna.

Each of the plurality of single antennas may be formed as an antenna using a metal type or dielectric substrate.

According to another exemplary embodiment of the present disclosure for achieving the above-described objective, a first array antenna capable of steering a beam in a first communication node in a wireless communication system may comprise: a plurality of single antennas each capable of variably adjusting a beam steering direction; a plurality of beamforming control units each of which is connected to each of the plurality of single antennas to control a beamforming operation of each of the plurality of single antennas; and an array antenna control unit connected to the plurality of beamforming control units to control a beamforming operation of the entire first array antenna, wherein the plurality of single antennas are arranged in a spherical shape and are installed to face a direction opposite to a central direction of the spherical shape, the first array antenna is configured to steer a beam to a predetermined area around the first communication node through at least one single antenna among the plurality of single antennas, and a first cavity in which the plurality of single antennas are not arranged is formed on one side of the first array antenna.

Each of the plurality of single antennas may include a primary mirror, a secondary mirror, and a beam emitter, and each of the plurality of beamforming control units connected to each of the plurality of single antennas may be configured to steer a beam by controlling a phase of the beam formed and radiated by the beam emitter.

The beam emitter of each of the plurality of single antennas may be an array emitter formed by arranging a plurality of sub-emitters each capable of forming and radiating a beam.

Each of the plurality of beamforming control units may be configured to variably control a beam steering direction of each of the plurality of single antennas by controlling whether or not to form and emit a beam of each of the plurality of sub-emitters included in each of the connected plurality of single antennas.

Each of the plurality of single antennas may be formed as an antenna of a Cassegrain structure capable of performing beamforming.

According to an exemplary embodiment of the present disclosure, a communication node can perform communications by forming beam(s) through the array antenna configured by arranging a plurality of ultra-high frequency high-gain single antennas in a plurality of directions. Here, the array antenna may be configured by arranging the plurality of single antennas in a spherical or cylindrical shape, and each of the single antennas can variably configure a direction of a beam. Accordingly, the array antenna can easily steer beam(s) in all directions around the communication node, a shadow area problem can be solved, and all the surrounding communication areas can be covered even from a low position regardless of the height at which the antenna is mounted. In addition, in the array antenna according to an exemplary embodiment of the present disclosure, a beam coverage can be adjusted according to a density of communication nodes by independently forming or synthesizing beams of the respective single antennas. Accordingly, communication resources can be used efficiently.

DETAILED DESCRIPTION OF THE EMBODIMENTS

Figure 1:
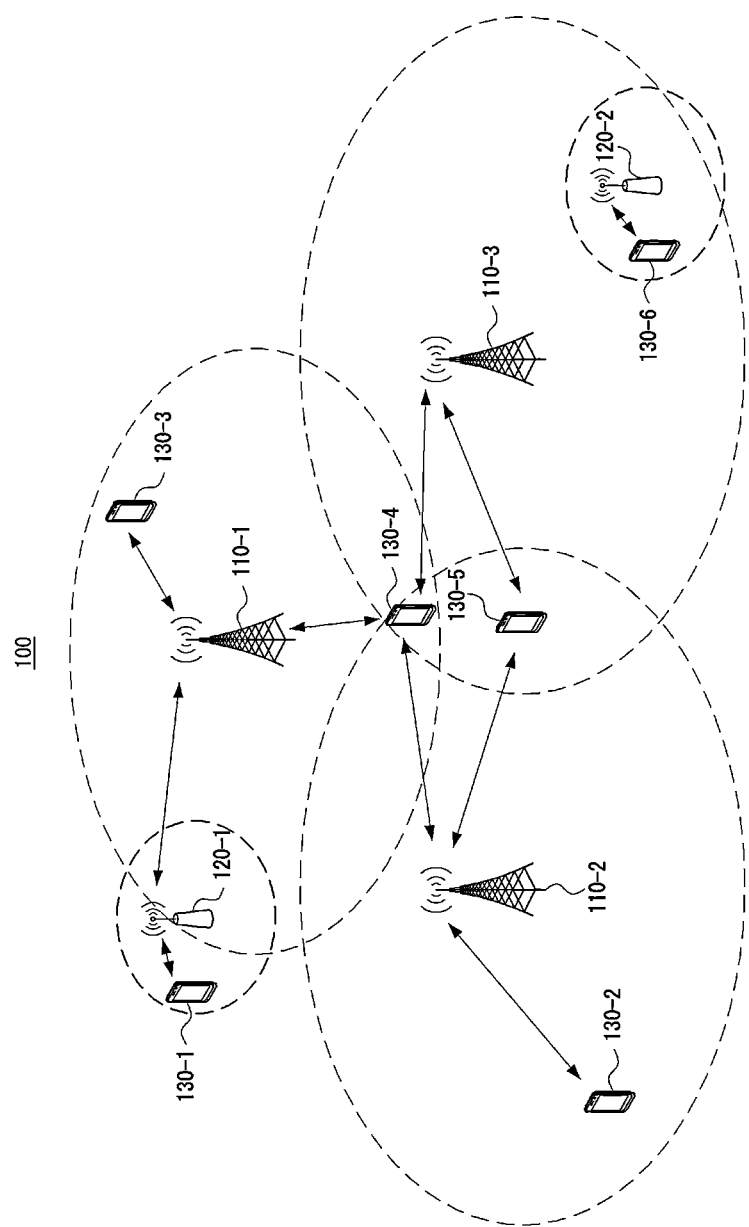
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSDPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MIME)).

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like. Each of the plurality of communication nodes may have the following structure.

Figure 2:
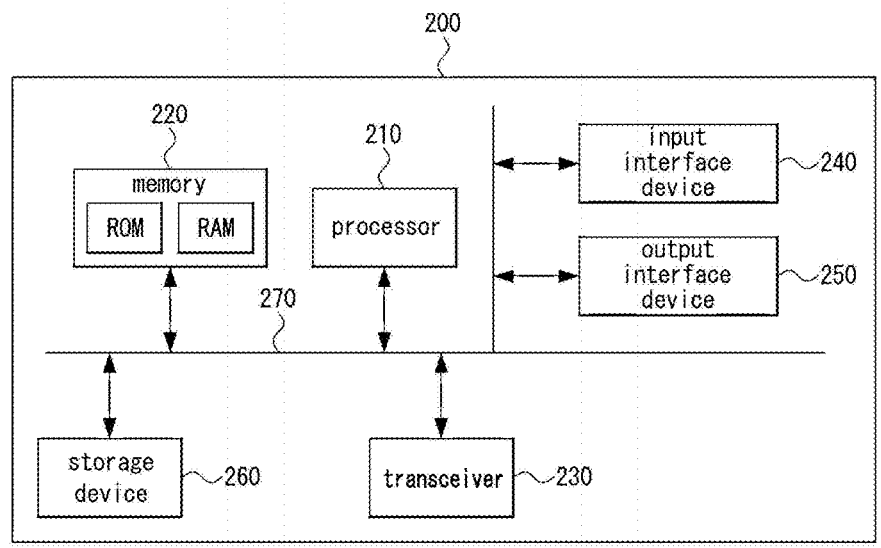
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in the communication system, the base station may perform all functions of a communication protocol (e.g., remote radio transmission/reception function, baseband processing function, etc.). Alternatively, the remote radio transmission/reception function among all the functions of the communication protocol may be performed by a transmission reception point (TRP) (e.g., flexible (f)-TRP), and the baseband processing function among all the functions of the communication protocol may be performed by a baseband unit (BBU) block. The TRP may be a remote radio head (RRH), a radio unit (RU), or a transmission point (TP). The BBU block may include at least one BBU or at least one digital unit (DU). The BBU block may be referred to as 'BBU pool', 'centralized BBU', or the like. The TRP may be connected to the BBU block through a wired fronthaul link or a wireless fronthaul link. A communication system composed of a backhaul link and a fronthaul link may be as follows. When the functional split technique is applied to the communication protocol, the TRP may selectively perform some functions of the BBU or some functions of the MAC/RLC.

The terahertz wave is a frequency resource in the range of 0.1 to 10 terahertz (THz) and may refer to an electromagnetic wave resource having physical characteristics in which the transmission of radio waves and the straightness of light waves appear simultaneously, corresponding to an intermediate region between far infrared rays and millimeter waves in the electromagnetic wave spectrum. The terahertz frequency band can be applied to a high-speed wireless communication system using a wide frequency bandwidth, for example, it is expected that various embodiments of a communication system using the terahertz band will be introduced in the sixth generation (6G) or later wireless communication technology.

Research on the terahertz band has been limited to oscillation and detection devices that generate and detect short-range signals, and it has a disadvantage in that it is not easy to achieve high output and high sensitivity at medium or long distances. On the other hand, in a study to perform communications in the terahertz band through a beamforming antenna supporting high-gain long-distance transmission, there is a problem in that a shadowing problem due to a narrow beamwidth needs to be solved.

Figure 3:
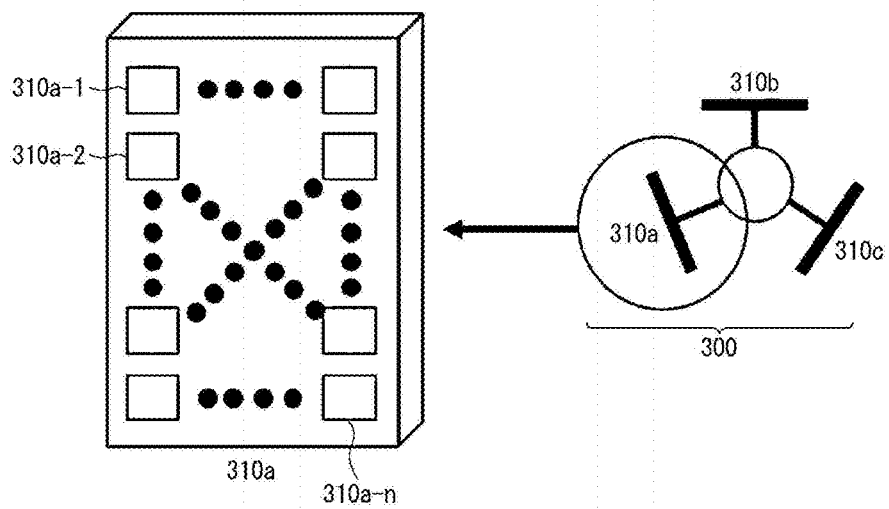
FIG. 3 is an exemplary diagram illustrating an exemplary embodiment of a sector antenna used in a communication system.

FIG. 3 is an exemplary diagram illustrating an exemplary embodiment of a sector antenna used in a communication system.

Referring to FIG. 3, a first communication node of the communication system may include a sector antenna 300 having a sector structure. Here, the first communication node may be the same as or similar to the communication node, base station, and/or terminal described with reference to FIGS. 1 and/or 2. The sector antenna 300 of the first communication node may include a plurality of single antennas 310a, 310b, and 310c. Each of the single antennas may include a plurality of array elements. For example, the first single antenna 310a may include a plurality of array elements 310a-1, 310a-2, . . . , and 310a-n on one surface. The first single antenna 310a may transmit a radio signal or beam through the plurality of array elements 310a-1, 310a-2, . . . , and 310a-n.

In an exemplary embodiment of the communication system, the sector antenna 300 of the first communication node may have a sector structure including the plurality of single antennas 310a, 310b, and 310c in order to perform beamforming in a plurality of directions. The first communication node may transmit a radio signal or beam in a plurality of directions through the plurality of single antennas 310a, 310b, and 310c respectively arranged in a plurality of directions in the sector antenna 300 having a sector structure. On the other hand, since the sector antenna 300 includes the plurality of single antennas 310a, 310b, and 310c, such as the first single antenna 310a composed of the plurality of array elements 310a-1, 310a-2, . . . , and 310a-n, the size and production cost of the entire antenna may increase. In addition, as the individual array elements form fixed beams in fixed directions, a shadow area between the beams (i.e., an area where beams do not reach) may occur, and an antenna mounting position may be limited. In addition, there is a problem that radio waves may be wasted as the radio waves are transmitted from all array elements regardless of the large or small number of communication nodes to perform communications.

Meanwhile, in another exemplary embodiment of the communication system, the first communication node may easily steer beam(s) in all directions around it through the array antenna configured by arranging a plurality of single antennas each capable of adjusting a direction of a beam in various directions. For example, the array antenna may be configured by arranging a plurality of single antennas capable of adjusting the direction of the beam in a spherical or cylindrical shape. Hereinafter, a configuration method of the array antenna will be described in more detail with reference to FIGS. 4A and 4B and FIGS. 5A and 5B.

Figure 4A:
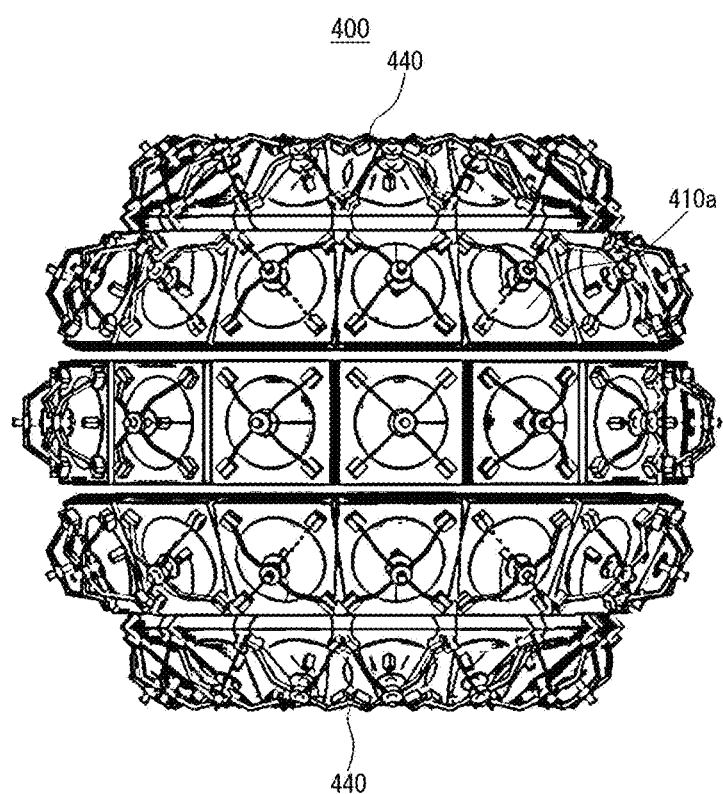
FIGS. 4A and 4B are exemplary diagrams for describing a first exemplary embodiment of configuring a first array antenna in a communication system.
Figure 4B:
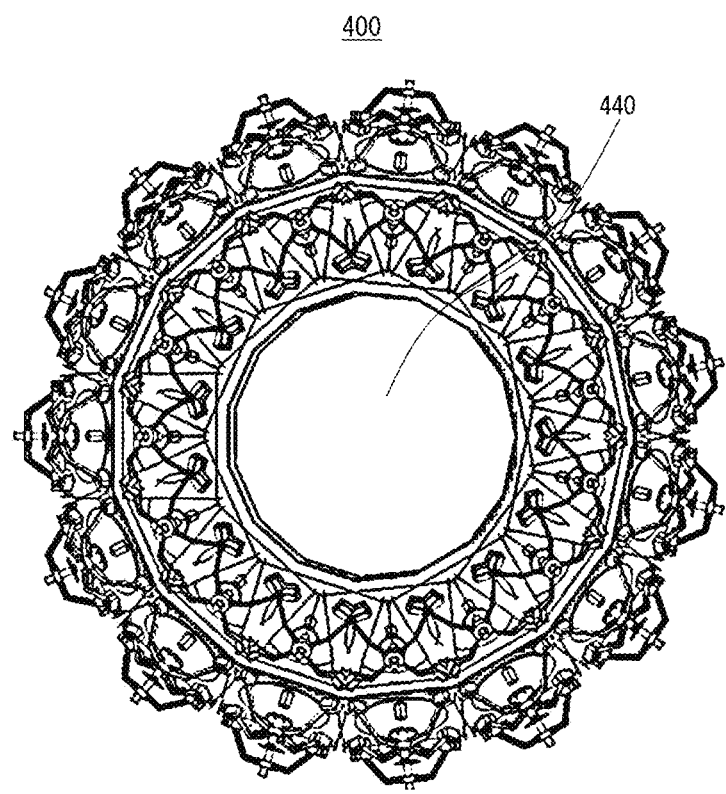

FIGS. 4A and 4B are exemplary diagrams for describing a first exemplary embodiment of configuring a first array antenna in a communication system.

Referring to FIGS. 4A and 4B, in an exemplary embodiment of the communication system, a first communication node may include a first array antenna 400 to steer a beam. Here, the first communication node may be the same as or similar to the communication node, base station, and/or terminal described with reference to FIGS. 1 and/or 2. The first array antenna 400 may be configured by arranging a plurality of single antennas in a plurality of directions.

Each of the single antennas constituting the first array antenna 400 may be configured to adjust a direction of a beam. For example, a first single antenna 410a among the plurality of single antennas constituting the first array antenna 400 may correspond to an antenna capable of steering a beam in a very high-frequency band or a terahertz wave band. In an exemplary embodiment of the communication system, the first single antenna 410a may correspond to a Cassegrain antenna that can perform beamforming (hereinafter, referred to as 'beamforming Cassegrain antenna'). However, this is only an example for convenience of description, and exemplary embodiments of the present disclosure are not limited thereto. For example, in another exemplary embodiment of the communication system, the first single antenna 410a may correspond to a beamforming horn antenna, a beamforming patch antenna, a dielectric patch antenna, a slot antenna, or the like. Alternatively, the first single antenna 410a may correspond to an antenna formed as at least one of antennas using other metal-type or dielectric substrates. The first single antenna 410a constituting the first array antenna 400 may have the same or similar technical characteristics as a first single antenna to be described below with reference to FIGS. 6A to 6C and FIGS. 7A and 7B.

The first array antenna 400 may be configured by arranging a plurality of single antennas configured in the same or similar manner as the first single antenna 410a in a plurality of directions. For example, the first array antenna 400 may be configured by arranging a plurality of single antennas in a spherical shape. Since a plurality of single antennas are arranged in a spherical shape as in FIGS. 4A and 4B, the first array antenna 400 may steer a beam in a plurality of directions to which the respective single antennas are directed. In addition, since each of the single antennas can control a direction of a beam, the first array antenna 400 may steer the beam in all directions around it, so that the problem of the shadow area may not occur.

Meanwhile, in an exemplary embodiment of the communication system, it may be expected that communication nodes to perform communications do not exist in an upper direction and/or a lower direction of the first array antenna 400. As shown in FIGS. 4A and 4B, a cavity 440 in which single antennas are not arranged may be formed on the upper side and/or the lower side of the first array antenna 400 configured by arranging the plurality of single antennas in a spherical shape. Through this, it may be possible to prevent unnecessarily arranging single antennas at positions predicted not to be used for actual communications, and effects such as reduction in production cost and power consumption can be expected. The cavity 440 in which single antennas are not arranged may be formed only on the upper side of the first array antenna 400, only on the lower side thereof, or on both the upper side and lower side thereof. Alternatively, the first array antenna 400 may be configured such that a plurality of single antennas are arranged in all directions without a separate cavity.

Figure 5A:
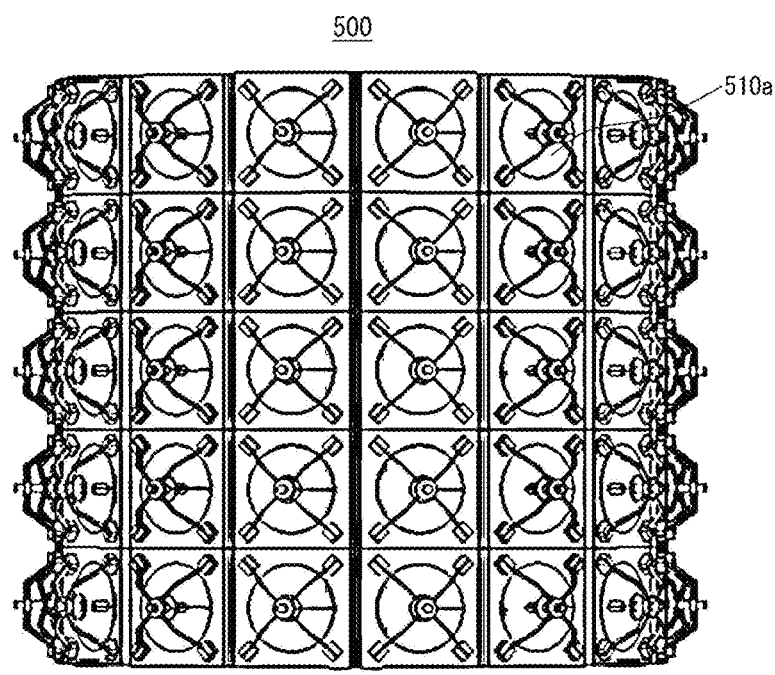
FIGS. 5A and 5B are exemplary diagrams for describing a second exemplary embodiment of configuring a first array antenna in a communication system.
Figure 5B:
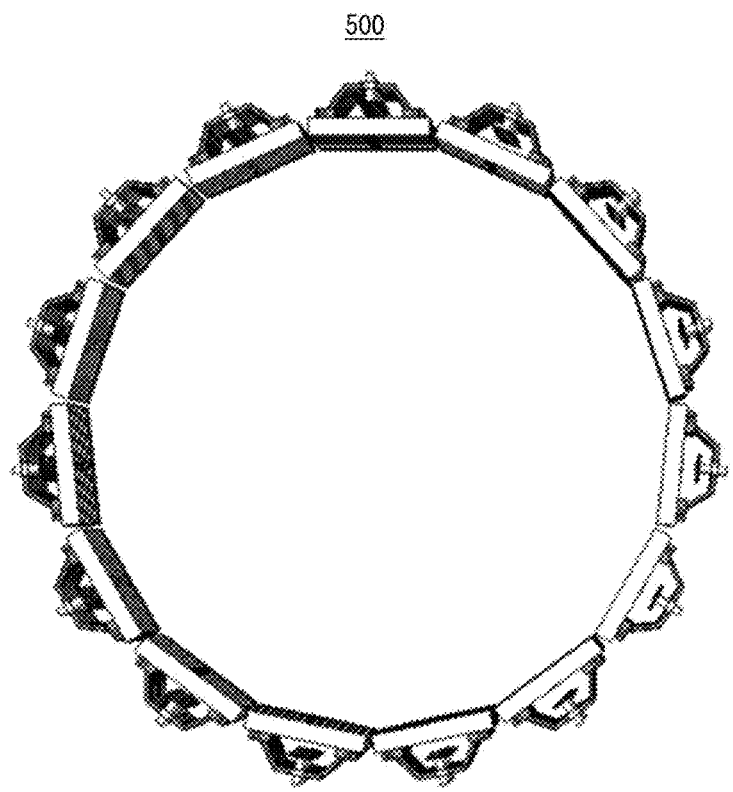

FIGS. 5A and 5B are exemplary diagrams for describing a second exemplary embodiment of configuring a first array antenna in a communication system. Hereinafter, in describing the second exemplary embodiment of configuring the first array antenna of the first communication node in the communication system with reference to FIGS. 5A and 5B, the content overlapping with those previously described with reference to FIGS. 4A and 4B may be omitted.

Referring to FIGS. 5A and 5B, in an exemplary embodiment of the communication system, a first communication node may include a first array antenna 500 to steer a beam.

The first array antenna 500 may be configured by arranging a plurality of single antennas in a plurality of directions. Each of the single antennas constituting the first array antenna 500 may be configured to adjust a direction of a beam. In an exemplary embodiment of the communication system, a first single antenna 510a may correspond to a beamforming Cassegrain antenna, a beamforming horn antenna, or a beamforming patch antenna. However, this is only an example for convenience of description, and exemplary embodiments of the present disclosure are not limited thereto. For example, in another exemplary embodiment of the communication system, the first single antenna 510a may correspond to a beamforming horn antenna, a beamforming patch antenna, a dielectric patch antenna, a slot antenna, or the like. Alternatively, the first single antenna 510a may correspond to an antenna formed as at least one of antennas using other metal-type or dielectric substrates. The first single antenna 510a constituting the first array antenna 500 may have the same or similar technical characteristics as a first single antenna to be described below with reference to FIGS. 6A to 6C and FIGS. 7A and 7B.

The first array antenna 500 may be configured by arranging a plurality of single antennas in a cylindrical shape, each capable of controlling a beam direction. FIG. 5A shows the entire structure of the first array antenna 500 configured in a cylindrical shape in an exemplary embodiment of the communication system, and FIG. 5B shows one layer forming the cylindrical structure shown in FIG. 5A. Since the plurality of single antennas are arranged in a cylindrical shape as shown in FIGS. 5A and 5B, the first array antenna 500 may steer a beam in a plurality of directions to which the respective single antennas are directed. In addition, since each of the single antennas can control the direction of the beam, the first array antenna 500 may steer the beam in all directions around it, so that the problem of the shadow area may not occur.

Figure 6A:
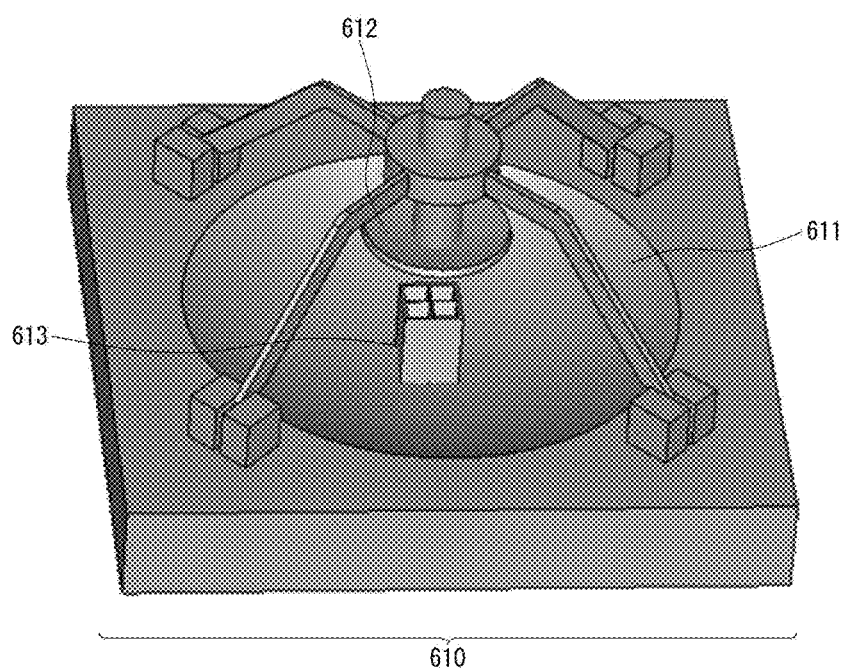
FIGS. 6A to 6C are exemplary diagrams for describing an exemplary embodiment of a first single antenna used for a first array antenna in a communication system.
Figure 6B:
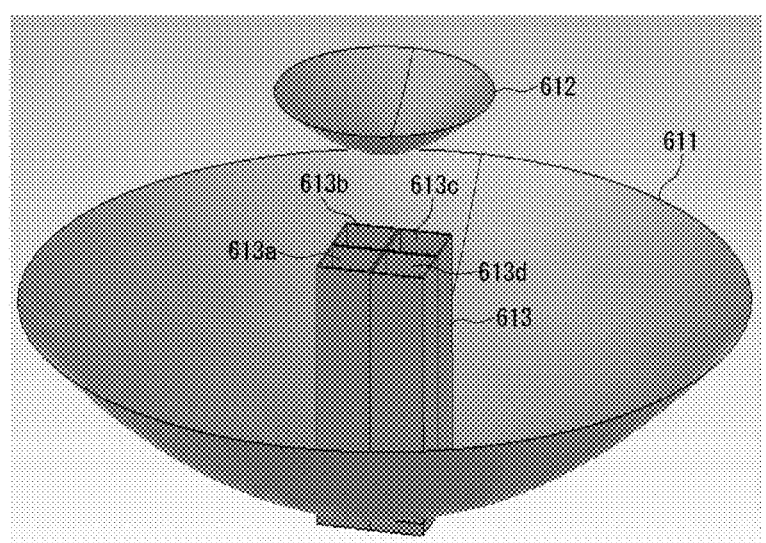
Figure 6C:
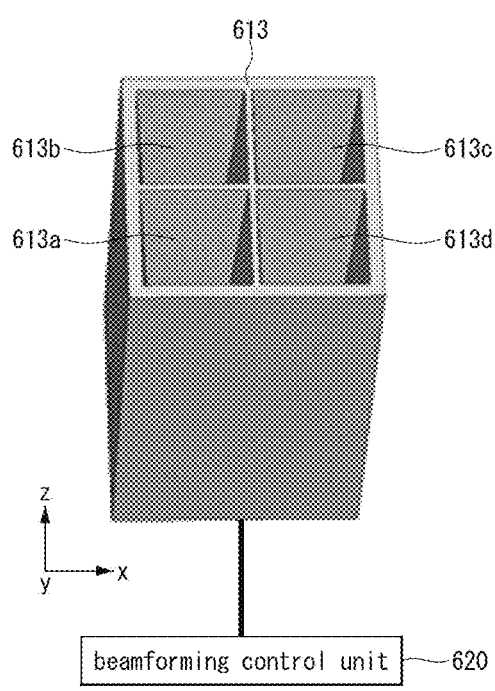

FIGS. 6A to 6C are exemplary diagrams for describing an exemplary embodiment of a first single antenna used for a first array antenna in a communication system.

Referring to FIGS. 6A to 6C, in an exemplary embodiment of the communication system, a first single antenna 610 used for a first array antenna of a first communication node may correspond to a beamforming Cassegrain antenna. Here, the first communication node may be the same as or similar to the communication node, base station, and/or terminal described with reference to FIGS. 1 and/or 2. The first single antenna 610 configured in the Cassegrain scheme may be configured to include two mirrors. The first single antenna 610 may include a primary reflector 611, a secondary mirror 612, an array emitter 613, and/or a beamforming control unit 620. Referring to FIG. 6A, the first single antenna 610 may include a plurality of supports for fixing and supporting the secondary mirror 612 at a position toward which the array emitter 613 faces. FIG. 6B may correspond to an exemplary diagram in which only the structures of the primary mirror 611, the secondary mirror 612, and the array emitter 613 are emphasized in the first single antenna 610.

The primary mirror 611 may have a parabolic structure formed based on a first virtual focal point. The secondary mirror 612 may have a hyperbolic structure formed based on a relationship between the first virtual focal point and a second virtual focal point coincident with a phase center point of the array emitter 613. In the first single antenna 610, the array emitter 613 may form a beam under the control of the beamforming control unit 620. The beam formed by the array emitter 613 may be reflected in the direction of the primary mirror 611 from the secondary mirror 612, and as it is reflected from the primary mirror 611, it may be steered in the direction to which the first single antenna 610 is directed.

The array emitter 613 may include a plurality of sub-emitters 613a, 613b, 613c, and 613d. The plurality of sub-emitters 613a, 613b, 613c, and 613d may correspond to a type of horn antenna or horn feeding. The array emitter 613 may be configured by arranging the plurality of sub-emitters. The array emitter 613 may also be referred to as 'array horn feeding' or 'array feeding horn'. In an exemplary embodiment, the array emitter 613 may be configured as a form in which four sub-emitters are arranged in a 2×2 structure. However, this is only an example for convenience of description, and exemplary embodiments of the present disclosure are not limited thereto. The plurality of sub-emitters 613a, 613b, 613c, and 613d may emit beams with different phases. Based on whether each of the plurality of sub-emitters 613a, 613b, 613c, and 613d forms and radiates a beam, and/or a phase difference between the radiated beams, the characteristics of the beam of the array emitter 613 (e.g., the direction and/or orbital angular momentum of the beam) may be determined. The operation of the first single antenna 610 forming the beam through the array emitter 613 (i.e., beamforming operation) may be controlled by the beamforming control unit 620. The beamforming control unit 620 may determine whether each of the plurality of sub-emitters 613a, 613b, 613c, and 613d forms and radiates a beam, and/or a mode (e.g., zero-order mode, first-order mode, etc.) of the beam mode. Accordingly, the beamforming control unit 620 may control the characteristics such as the direction of the beam formed by the first single antenna 610.

Figure 7A:
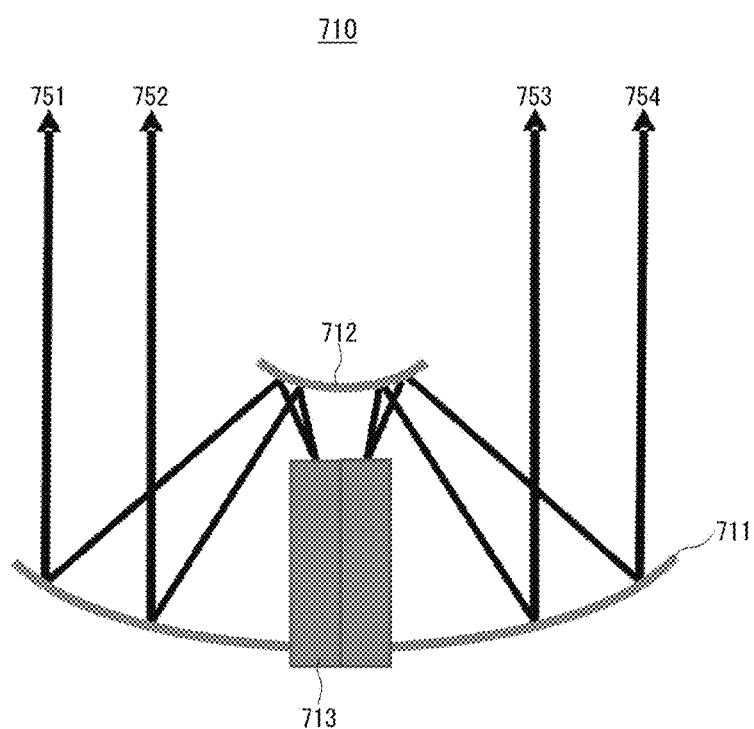
FIGS. 7A and 7B are conceptual diagrams for describing an exemplary embodiment of an operation of performing beamforming in a first single antenna.
Figure 7B:
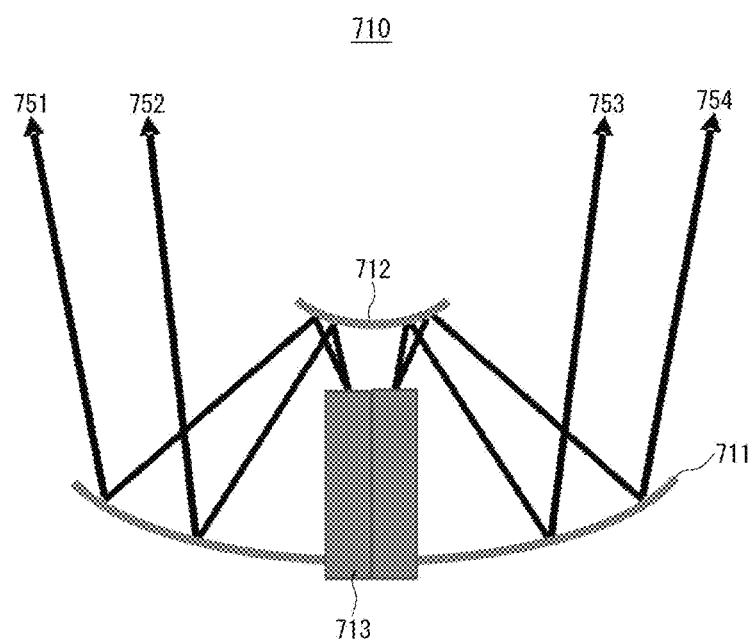

FIGS. 7A and 7B are conceptual diagrams for describing an exemplary embodiment of an operation of performing beamforming in a first single antenna.

Referring to FIGS. 7A and 7B, beamforming may be performed by forming and radiating a beam through one or a plurality of emitters in the first single antenna 710. The first single antenna 710 shown in FIGS. 7A and 7B may be the same as or similar to the first single antenna 610 described with reference to FIGS. 6A to 6C. The first single antenna 710 may be configured to include a primary mirror 711, a secondary mirror 712, and an array emitter 713. An operation of performing beamforming in the first single antenna 710 may be controlled through a beamforming control unit (not shown). Here, the beamforming control unit may be the same as or similar to the beamforming control unit 620 described with reference to FIGS. 6A to 6C. For example, the beamforming control unit may determine whether each of the plurality of sub-emitters constituting the array emitter 713 forms and radiates a beam, and/or a mode of the beam (e.g., zero-order mode, first-order mode, etc.) to control the beamforming operation.

As shown in FIG. 7A, the beamforming control unit may control the beam radiated from the first single antenna 710 to be radiated in a direction coincident with a direction to which the primary mirror 711 is directed. For example, the beamforming control unit may cause the array emitter 713 to form and radiate a beam of a zero-order mode. In this case, the radiated beam may be primarily reflected by the secondary mirror 712 formed as a hyperbolic surface, secondarily reflected by the primary mirror 711 formed as a parabolic surface, and radiated in a direction coincident with the direction to which the primary mirror 711 is directed.

Meanwhile, as shown in FIG. 7B, the beamforming control unit may control the beam radiated from the first single antenna 710 to be radiated in a direction different from the direction to which the primary mirror 711 is directed. For example, the beamforming control unit may cause the array emitter 713 to form and radiate a beam of a first-order mode. In this case, the beam of the first-order mode may be radiated in a direction different from the direction to which the primary mirror 711 is directed due to the phase difference between the beams emitted from the respective sub-emitters, unlike the beam of the zero-order mode.

As shown in FIGS. 7A and 7B, the beamforming control unit may control the beam radiated from the first single antenna 710 to be radiated in the same direction as the direction to which the primary mirror 711 is directed, or to be radiated in a direction different from the direction to which the primary mirror 711 is directed. That is, the beamforming control unit may control the direction of the beam radiated from the first single antenna 710. The first single antenna 710 may adjust the direction of the radiated beam according to the control of the beamforming control unit.

Figure 8:
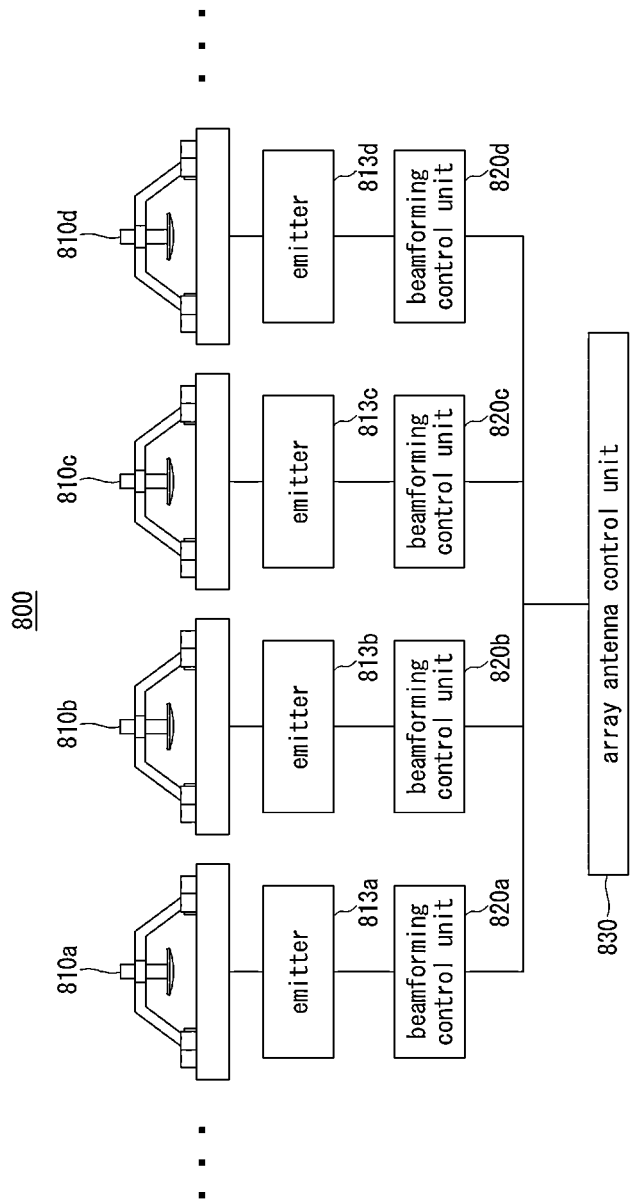
FIG. 8 is a structural diagram for describing an exemplary embodiment of a structure of a first array antenna.

FIG. 8 is a structural diagram for describing an exemplary embodiment of a structure of a first array antenna.

Referring to FIG. 8, a first communication node according to an exemplary embodiment of the communication system may include a first array antenna 800. Here, the first communication node may be the same as or similar to the communication node, base station, and/or terminal described with reference to FIGS. 1 and/or 2. The first array antenna may be configured by arranging a plurality of single antennas 810a, 810b, 810c, and 810d. As in the exemplary embodiment described with reference to FIGS. 4A and 4B, the first array antenna 800 may be configured by arranging the plurality of single antennas 810a, 810b, 810c, and 810d in a spherical shape. Alternatively, as in the exemplary embodiment described with reference to FIGS. 5A and 5B, the plurality of single antennas 810a, 810b, 810c, and 810d may be arranged in a cylindrical shape.

The plurality of single antennas 810a, 810b, 810c, and 810d may include array emitters 813a, 813b, 813c, and 813d and beamforming control units 820a, 820b, 820c, and 820d, respectively. Each of the plurality of single antennas 810a, 810b, 810c, and 810d may be the same as or similar to the first single antenna 610 described with reference to FIGS. 6A to 6C and/or the first single antenna 710 described with reference to FIGS. 7A and 7B. The plurality of single antennas 810a, 810b, 810c, and 810d may be controlled by an array antenna control unit 830 that controls the entire array antenna 800. Each of the plurality of single antennas 810a, 810b, 810c, and 810d may independently form and radiate a beam under the control of each of the beamforming control units 820a, 820b, 820c, and 820d. The direction of the beam radiated by each of the plurality of single antennas 810a, 810b, 810c, and 810d may be variably configured. Meanwhile, the array antenna control unit 830 may control beams of some single antennas among the plurality of single antennas 810a, 810b, 810c, and 810d to be synthesized and steered. For example, when desiring to steer a beam for an area requiring a large output due to reasons such as a long-distance or high terminal density, the array antenna control unit 830 may control the beams of some single antennas to be synthesized and steered. The direction of the synthesized and steered beam may be variably configured according to the control of the array antenna control unit 830 and/or the respective beamforming control units.

Figure 9A:
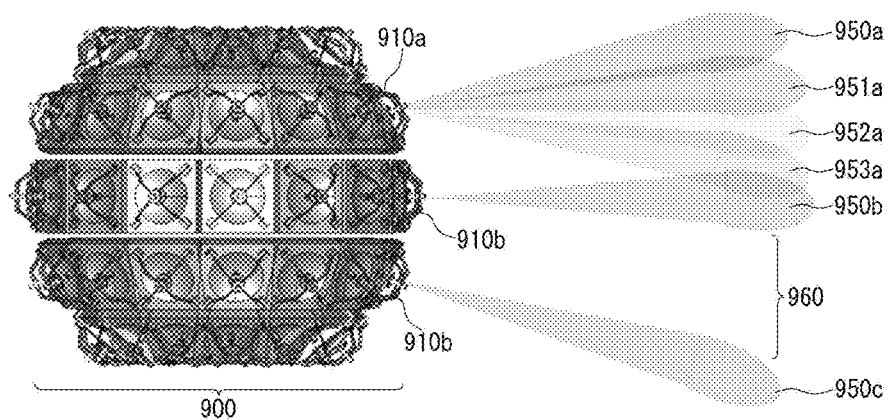
FIGS. 9A and 9B are exemplary diagrams for describing first and second exemplary embodiments of a beamforming method in a first array antenna.
Figure 9B:
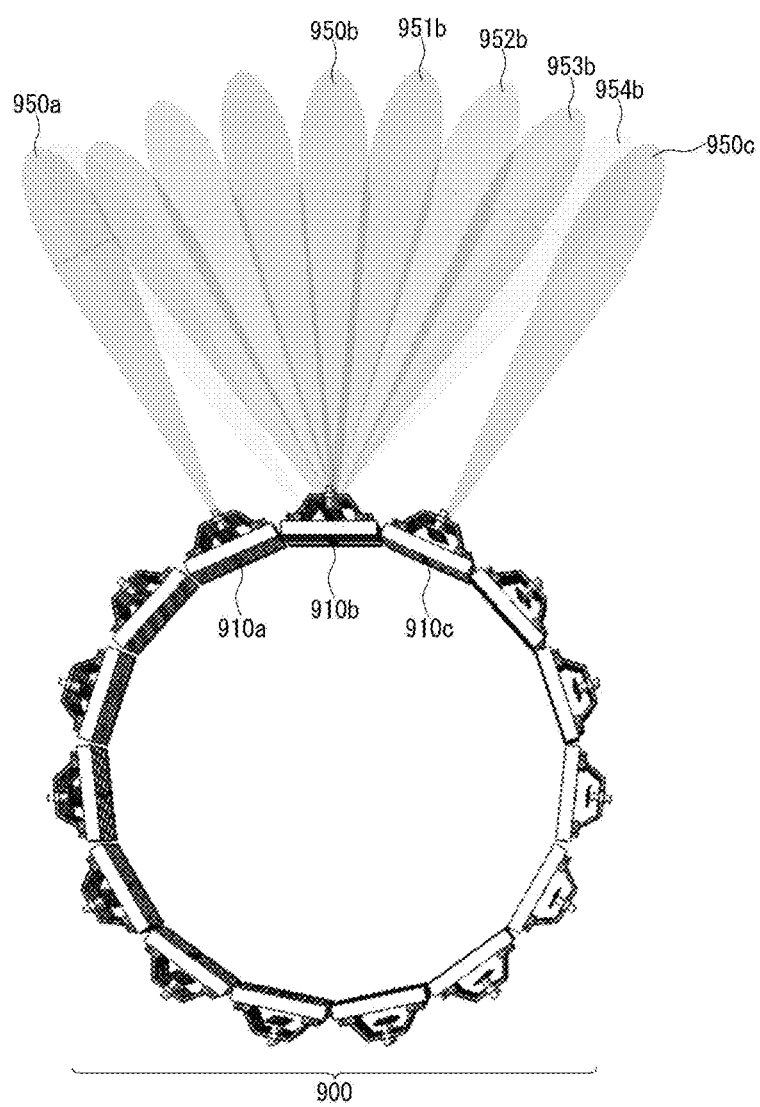

FIGS. 9A and 9B are exemplary diagrams for describing first and second exemplary embodiments of a beamforming method in a first array antenna.

Referring to FIGS. 9A and 9B, a first array antenna 900 of a first communication node may perform an operation to cover a shadow area in a vertical direction and/or a horizontal direction. Here, the first communication node may be the same as or similar to the communication node, base station, and/or terminal described with reference to FIGS. 1 and/or 2. Although an exemplary embodiment in which the first array antenna 900 is formed in a spherical shape is exemplarily shown in FIGS. 9A and 9B, the first array antenna 900 may not be limited to a spherical shape and may be configured in various shapes such as a cylindrical shape. The first array antenna 900 may be configured identically or similarly to the first array antenna 800 described with reference to FIG. 8. Each of the plurality of single antennas constituting the first array antenna 900 may be the same as or similar to the first single antenna 610 described with reference to FIGS. 6A to 6C, and/or the first single antenna 710 described with reference to FIGS. 7A and 7B.

Referring to FIG. 9A, in the first exemplary embodiment of the beamforming method in the first array antenna of the first communication node, the first array antenna 900 may perform an operation to cover a shadow area in a vertical direction. Each of the plurality of single antennas constituting the first array antenna 900 may form and radiate a beam. For example, a first single antenna 910a, a second single antenna 910b, and a third single antenna 910c may steer beams 950a, 950b, and 950c in directions to which the respective primary mirrors are directed. The beams 950a, 950b, and 950c may be steered to different directions in the vertical direction. As each beam is steered in a different direction, a shadow area in which no beam reaches may be formed. For example, between the beams 950b and 950c formed by the second and third single antennas 910b and 910c, a shadow area 960 in the vertical direction not covered by any one of the second and third single antennas 950b and 950c may be formed.

The first array antenna 900 may variably adjust a direction of a beam radiated from each single antenna in order to steer the beam to an area not covered between the beams. For example, the first array antenna 900 may control directions of the beams 950a and 950c of the first and second single antennas 910a and 910b to steer the beams to an area between the beams. The first single antenna 910a may form and radiate beams steered in the vertical direction, such as beams 951a, 952a, and/or 953a. Accordingly, the shadow area generated in the vertical direction in the communication area of the first array antenna 900 may be easily covered.

Meanwhile, referring to FIG. 9B, in the second exemplary embodiment of the beamforming method in the first array antenna of the first communication node, the first array antenna may perform an operation to cover a shadow area in the horizontal direction. Hereinafter, in describing the second exemplary embodiment of the beamforming method in the first array antenna of the first communication node with reference to FIG. 9B, the content overlapping with those previously described with reference to FIG. 9A may be omitted.

The first single antenna 910a, the second single antenna 910b, and the third single antenna 910c may steer the beams 950a, 950b, and 950c in directions to which the respective primary mirrors are directed. The beams 950a, 950b, and 950c may be steered to different directions in the horizontal direction. Since each beam is steered in a different direction, a horizontal shadow area in which no beam reaches may be formed. The first array antenna 900 may variably adjust a direction of a beam radiated from each single antenna in order to steer the beam to an area not covered between the beams. For example, the first array antenna 900 may adjust the beam steering direction of the second single antenna 910*b*. The second single antenna 910*b* may form and radiate beams 951*b*, 952*b*, 953*b* and/or 954*b* having a direction adjusted in the horizontal direction. Accordingly, the shadow area occurring in the horizontal direction in the communication area of the first array antenna 900 may be easily covered.

In an exemplary embodiment of the communication system, a series of operations for covering the shadow area in the vertical direction and/or the horizontal direction described above with reference to FIGS. 9A and 9B may be integrated and performed. Alternatively, in an exemplary embodiment of the communication system, operations for covering a shadow area may be performed in various directions without being limited to the vertical direction and/or the horizontal direction.

Figure 10:
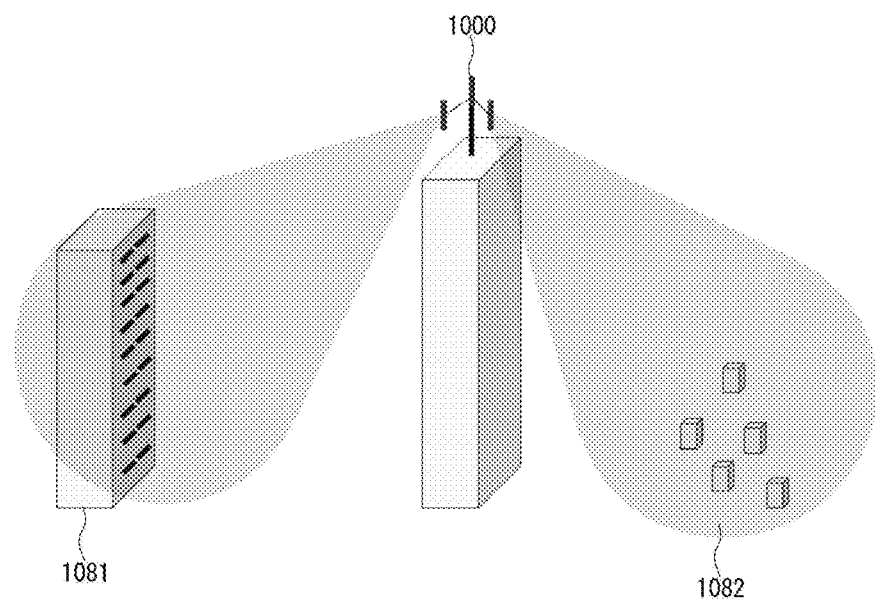
FIG. 10 is an exemplary diagram for describing an exemplary embodiment in which a first communication node steers a beam through a sector antenna in a communication system.

FIG. 10 is an exemplary diagram for describing an exemplary embodiment in which a first communication node steers a beam through a sector antenna in a communication system.

Referring to FIG. 10, in an exemplary embodiment of the communication system, a sector antenna 1000 may be used by a first communication node to steer a beam to a communication area. Here, the first communication node may be the same as or similar to the communication node, base station, and/or terminal described with reference to FIGS. 1 and/or 2. The sector antenna 1000 may be, for example, the same as or similar to the sector antenna 300 described with reference to FIG. 3. The sector antenna 1000 may steer a beam to a building 1081 and/or users or terminals 1082 outdoors.

In the sector antenna 1000, it may not be easy to dynamically adjust a beam direction of each of the single antennas and/or of array elements constituting each of the single antennas. In order to reduce a possibility of a communication failure due to a shadow area or an obstacle on a communication path, the sector antenna 1000 may need to be disposed at a position higher than the areas 1081 and 1082 to steer the beam. The sector antenna 1000 with such the structure may have restrictions on installation locations, etc., and accordingly, installation and maintenance costs may be excessively consumed.

Figure 11A:
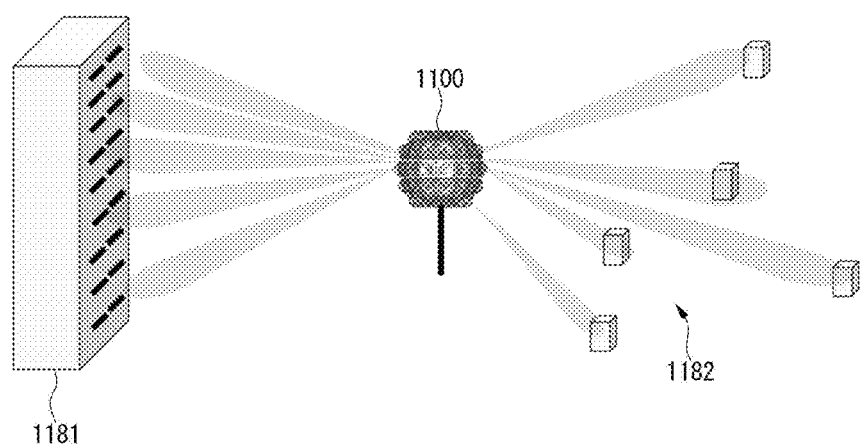
FIGS. 11A and 11B are exemplary diagrams for describing an exemplary embodiment in which a first communication node steers a beam through a first array antenna in a communication system.
Figure 11B:
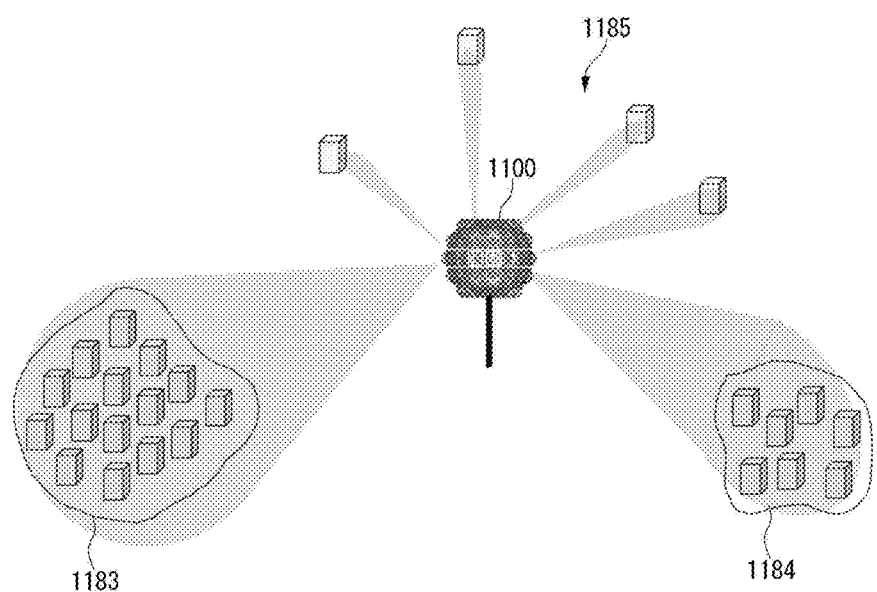

FIGS. 11A and 11B are exemplary diagrams for describing an exemplary embodiment in which a first communication node steers a beam through a first array antenna in a communication system.

Referring to FIGS. 11A and 11B, in an exemplary embodiment of a communication system, a first communication node may form and radiate a beam through a first array antenna 1100 including a plurality of single antennas. Here, the first communication node may be the same as or similar to the communication node, base station, and/or terminal described with reference to FIGS. 1 and/or 2. FIGS. 11A and 11B show an exemplary embodiment in which the first array antenna 1100 is formed in a spherical shape, but the first array antenna 1100 may not be limited to the spherical shape and may be configured in various three-dimensional shapes such as a cylindrical shape. The first array antenna 1100 may be configured identically or similarly to the first array antenna 800 described with reference to FIG. 8 and/or the first array antenna 900 described with reference to FIGS. 9A and 9B. Each of the plurality of single antennas constituting the first array antenna 1100 may be the same as or similar to the first single antenna 610 described with reference to FIGS. 6A to 6C, and/or the first single antenna 710 described with reference to FIGS. 7A and 7B.

Referring to FIG. 11A, since the first array antenna 1100 is configured with a plurality of single antennas arranged in a three-dimensional shape, a beam can be easily steered in all directions to form a coverage. When the first array antenna 1100 desires to form a coverage by steering a beam with respect to a high-rise building 1181 or desires to steer a beam with respect to communication nodes 1182 widely distributed in vertical/horizontal directions, the first array antenna 1100 may easily steer a beam by being installed in various positions without restrictions according to a height, etc.

Referring to FIG. 11B, in the first array antenna 1100 may control the plurality of single antennas to independently steer beams, or control beams of some single antennas to be synthesized so that the beams are steered in form of a composite beam. For example, when desiring to steer a beam to an area 1183 with high density of users or terminals, high communication quality may be guaranteed by forming and steering a composite beam of high gain/high power/wide coverage by multiple single antennas. On the other hand, when desiring to steer a beam to an area 1184 where the density of users or terminals is not high, a composite beam of low gain/low power/narrow coverage may be formed and steered. Alternatively, when desiring beams for users or terminals 1185 that are not densely distributed and are individually distributed, each of the plurality of single antennas may be configured to steer the beam independently.

According to an exemplary embodiment of the present disclosure, a communication node can perform communications by forming beam(s) through the array antenna configured by arranging a plurality of ultra-high frequency high-gain single antennas in a plurality of directions. Here, the array antenna may be configured by arranging the plurality of single antennas in a spherical or cylindrical shape, and each of the single antennas can variably configure a direction of a beam. Accordingly, the array antenna can easily steer beam(s) in all directions around the communication node, a shadow area problem can be solved, and all the surrounding communication areas can be covered even from a low position regardless of the height at which the antenna is mounted. In addition, in the array antenna according to an exemplary embodiment of the present disclosure, a beam coverage can be adjusted according to a density of communication nodes by independently forming or synthesizing beams of the respective single antennas. Accordingly, communication resources can be used efficiently.

However, the effects that can be achieved by the high frequency-based array antenna and the communication method using the same, according to the exemplary embodiments of the present disclosure, are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A first array antenna capable of steering a beam in a first communication node of a wireless communication system, the first array antenna comprising:
   a plurality of single antennas each capable of variably adjusting a beam steering direction;
   a plurality of beamforming control units each of which is connected to each of the plurality of single antennas to control a beamforming operation of each of the plurality of single antennas; and
   an array antenna control unit connected to the plurality of beamforming control units to control a beamforming operation of the entire first array antenna,
   wherein the plurality of single antennas are arranged in a cylindrical shape and are installed to face a direction opposite to a central direction of the cylinder shape, and the first array antenna is configured to steer a beam to a predetermined area around the first communication node through at least one single antenna among the plurality of single antennas.

2. The array antenna according to claim 1, wherein each of the plurality of single antennas includes a primary mirror, a secondary mirror, and a beam emitter, and each of the plurality of beamforming control units connected to each of the plurality of single antennas is configured to steer a beam by controlling a phase of the beam formed and radiated by the beam emitter.

3. The array antenna according to claim 2, wherein the beam emitter of each of the plurality of single antennas is an array emitter formed by arranging a plurality of sub-emitters each capable of forming and radiating a beam.

4. The array antenna according to claim 3, wherein each of the plurality of beamforming control units is configured to variably control a beam steering direction of each of the plurality of single antennas by controlling whether or not to form and emit a beam of each of the plurality of sub-emitters included in each of the connected plurality of single antennas.

5. The array antenna according to claim 1, wherein each of the plurality of single antennas is formed as an antenna of a Cassegrain structure capable of performing beamforming.

6. The array antenna according to claim 1, wherein each of the plurality of single antennas is formed as at least one of a horn antenna, a dielectric patch antenna, and a slot antenna.

7. The array antenna according to claim 1, wherein each of the plurality of single antennas is formed as an antenna using a metal type or dielectric substrate.

8. A first array antenna capable of steering a beam in a first communication node in a wireless communication system, the first array antenna comprising:
   a plurality of single antennas each capable of variably adjusting a beam steering direction;
   a plurality of beamforming control units each of which is connected to each of the plurality of single antennas to control a beamforming operation of each of the plurality of single antennas; and
   an array antenna control unit connected to the plurality of beamforming control units to control a beamforming operation of the entire first array antenna,
   wherein the plurality of single antennas are arranged in a spherical shape and are installed to face a direction opposite to a central direction of the spherical shape, the first array antenna is configured to steer a beam to a predetermined area around the first communication node through at least one single antenna among the plurality of single antennas, and a first cavity in which the plurality of single antennas are not arranged is formed on one side of the first array antenna.

9. The array antenna according to claim 8, wherein each of the plurality of single antennas includes a primary mirror, a secondary mirror, and a beam emitter, and each of the plurality of beamforming control units connected to each of the plurality of single antennas is configured to steer a beam by controlling a phase of the beam formed and radiated by the beam emitter.

10. The array antenna according to claim 9, wherein the beam emitter of each of the plurality of single antennas is an array emitter formed by arranging a plurality of sub-emitters each capable of forming and radiating a beam.

11. The array antenna according to claim 10, wherein each of the plurality of beamforming control units is configured to variably control a beam steering direction of each of the plurality of single antennas by controlling whether or not to form and emit a beam of each of the plurality of sub-emitters included in each of the connected plurality of single antennas.

12. The array antenna according to claim 8, wherein each of the plurality of single antennas is formed as an antenna of a Cassegrain structure capable of performing beamforming.

* * * * *